United States Patent [19]

Lofquist et al.

[11] Patent Number: 5,761,893
[45] Date of Patent: Jun. 9, 1998

[54] CROP SAVING ATTACHMENT FOR THE SNOUTS OF COMBINES

[75] Inventors: Donald Lofquist; Steve L. Lofquist, both of Elwood, Nebr.

[73] Assignee: Lofquist Welding, Inc., Elwood, Nebr.

[21] Appl. No.: 734,590

[22] Filed: Oct. 22, 1996

[51] Int. Cl.⁶ .................................................. A01D 45/02
[52] U.S. Cl. .......................... 56/94; 56/119; 56/DIG. 20; 56/DIG. 24; 56/320.1
[58] Field of Search .............................. 56/105, 119, 51, 56/52, 80, 84, 94, 109, DIG. 9, DIG. 20, DIG. 24, 320.1

[56] References Cited

U.S. PATENT DOCUMENTS

| 2,751,744 | 6/1956 | Reade et al. |
|---|---|---|
| 3,585,790 | 6/1971 | Kalkwarf .................... 56/106 X |
| 3,785,130 | 1/1974 | Gaeddert ........................ 56/98 |
| 4,037,393 | 7/1977 | Anderson . |
| 4,300,335 | 11/1981 | Anderson . |
| 4,429,516 | 2/1984 | Erickson . |
| 4,446,682 | 5/1984 | Jennen et al. . |
| 4,493,181 | 1/1985 | Glendenning et al. . |
| 4,566,256 | 1/1986 | Sousek ......................... 56/98 X |
| 4,589,250 | 5/1986 | Faul, Jr. ...................... 56/119 X |
| 5,444,968 | 8/1995 | Barton . |

*Primary Examiner*—Heather Shackelford
*Attorney, Agent, or Firm*—Zarley, McKee, Thomte, Voorhees, & Sease

[57] ABSTRACT

A crop saving attachment is affixed to the outermost snouts of a combine crop header such as a corn header by being fastened only to the gathering point at its downwardly facing rear U-shaped edge and the metal tip at the forward end of the gathering point. The crop saving attachment is movable with the gathering point as it pivots relative to the rear snout section and the wall of the attachment extends upwardly and rearwardly over the rear snout section to deflect down corn stalks laterally inwardly towards the header snapper rollers.

10 Claims, 4 Drawing Sheets

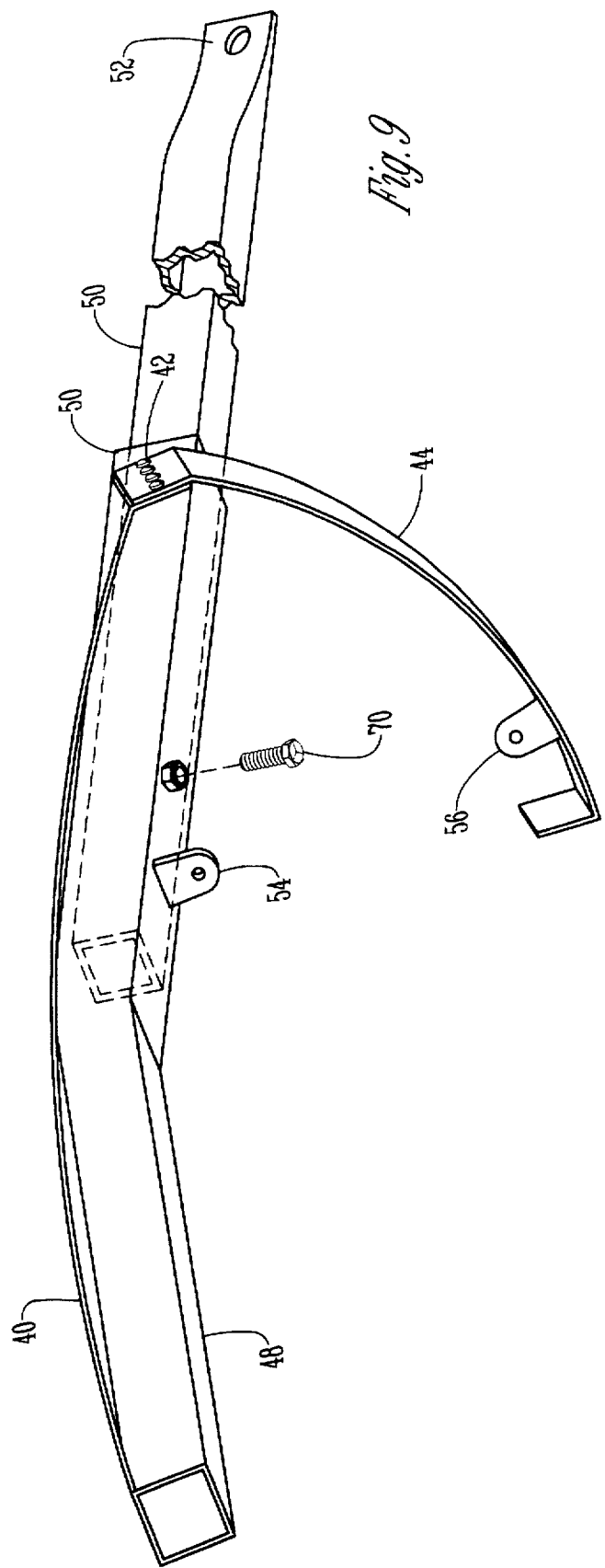

5,761,893

CROP SAVING ATTACHMENT FOR THE SNOUTS OF COMBINES

BACKGROUND OF THE INVENTION

Corn stalks that have fallen over and which are received between the two outermost snouts on a combine head are vulnerable to being broken off and the corn ears being lost if the stalk lays over the outermost snout. If a substantial portion of the stalk including the corn ears lay on the outside of the outside snout the stalk will eventually break off as the snout moves forwardly down the row. What is needed is an ear saver attachment for the outermost snouts that will assure that the stalk and the ears of corn on the stalk are deflected inwardly towards the adjacent snout, and will be picked up by the snapping rollers of the corn header. There are a number of attachments on the market for this purpose but each of them has disadvantages as compared to the attachment of this invention. In particular, what is needed is an attachment which can be mounted to the gathering point only, but will also extend upwardly and rearwardly over the rear snout section. The attachment should be made possible without drilling holes in the gathering point.

SUMMARY OF THE INVENTION

The crop saving attachment of this invention is fastened only to the gathering point through an inverted U-shaped bracket connected to existing bolts on the rear inverted U-shaped edge of the gathering point and to the metal tip at the forward end of the gathering point utilizing existing fastening bolts. The attachment is positioned on top of the gathering point at its rear end and then extends upwardly and rearwardly over the rear section of the snout. The attachment includes an inverted U-shaped wall to which an elongated member is connected which extends along the top surface of the gathering point to a bolt that connects the metal tip to the forward end of the plastic gathering point.

The simplicity of the design of the crop saving attachment produces its cost manufacture and makes easy its attachment to the gathering point and removal therefrom.

DESCRIPTION OF THE DRAWINGS

FIG. 6 is a side elevational view of the elongated member used to connect the attachment wall to the tip of the gathering point.

FIG. 7 is a plan view of a tubular member intended to be secured to the bottom edge of the inner attachment wall half section for telescopically receiving the elongated member of FIG. 6 to connect the attachment wall to the gathering point tip.

FIG. 9 is a rear fragmentary perspective view of the attachment including the pair of wall half sections and elongated member for connecting the attachment to the tip of the gathering point.

DESCRIPTION OF THE PREFERRED EMBODIMENT

Figure 1:
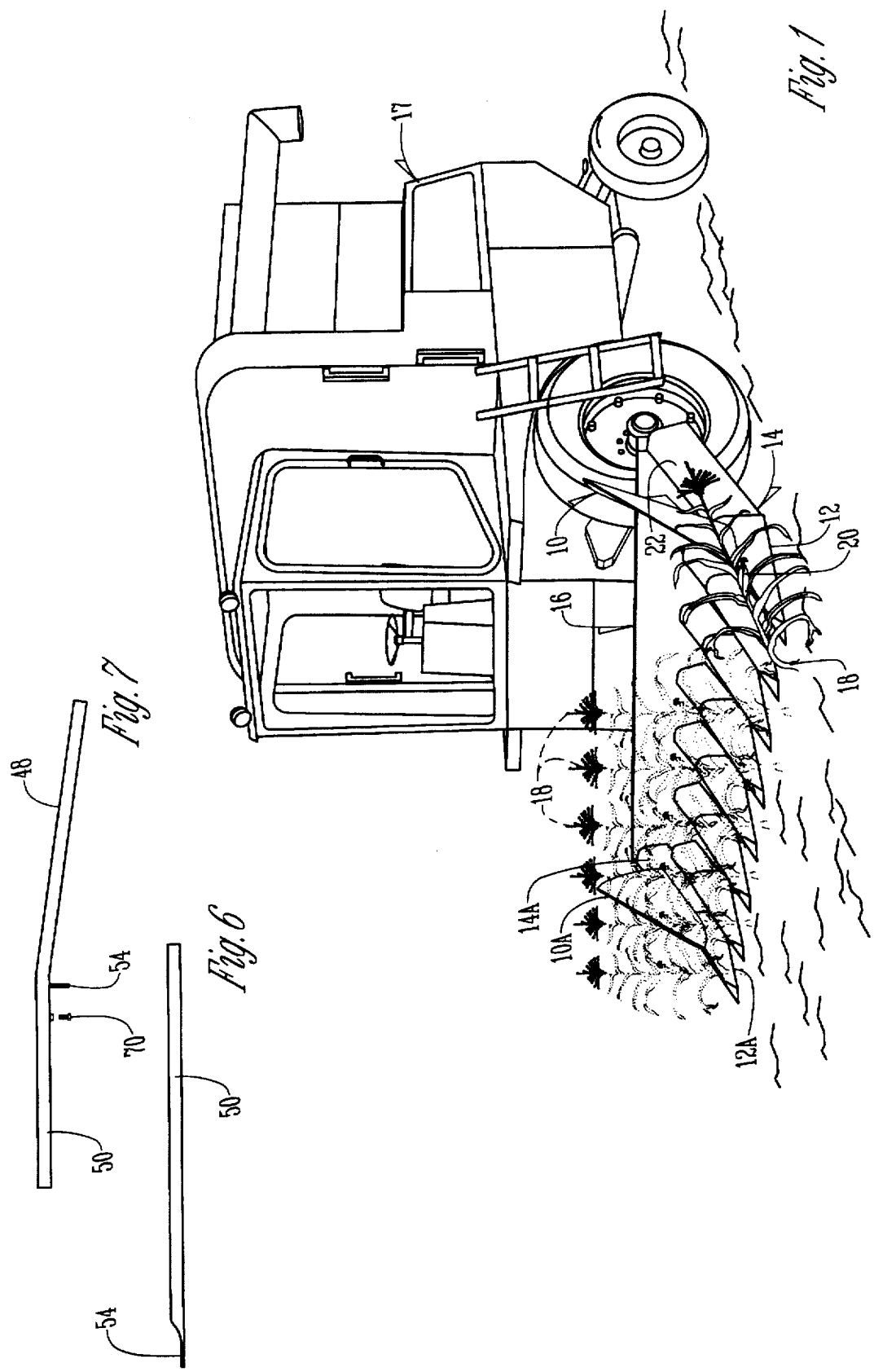
FIG. 1 is a front perspective view of a combine having a corn header with the crop saving attachment of this invention affixed to the outermost snouts for deflecting down corn stalks inwardly into the snapping rollers of the corn head.
Figure 2:
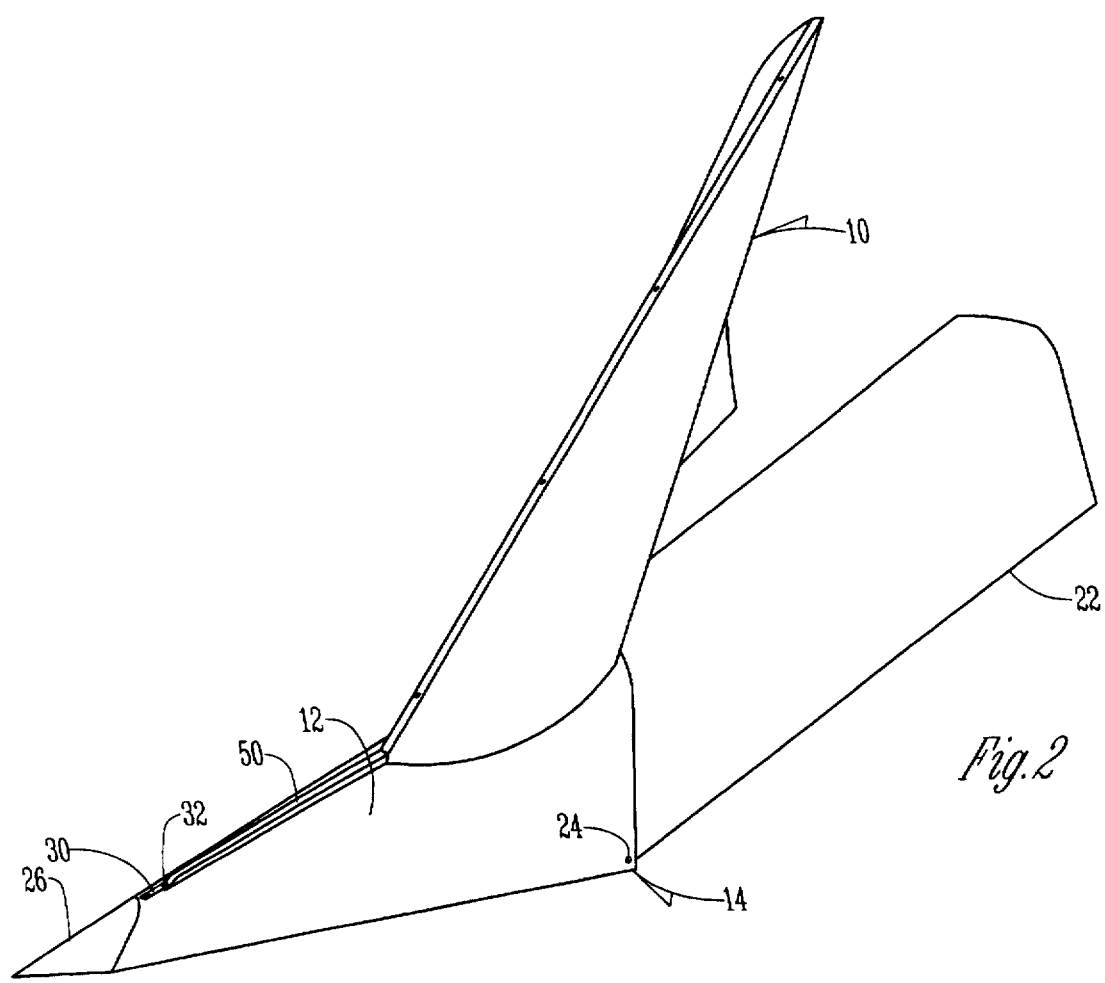
FIG. 2 is a front fragmentary perspective view of the left corn head snout with the crop saving attachment of this invention mounted thereon.
Figure 5:
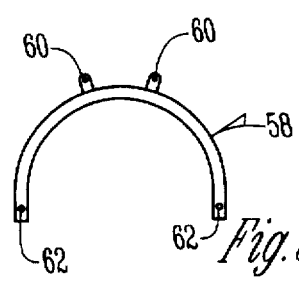
FIG. 5 is a rear end elevational view of the downwardly facing U-shaped bracket utilized to connect the attachment wall to the rear end of the gathering point.
Figure 4:
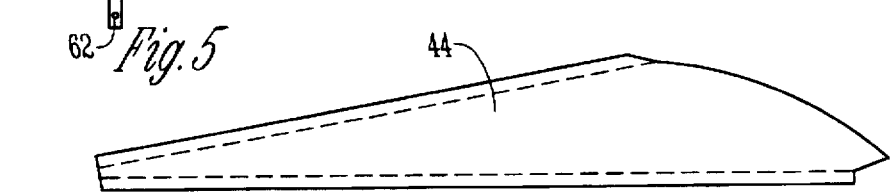
FIG. 4 is a plan view of the outer half section wall of the crop saving attachment.
Figure 3:
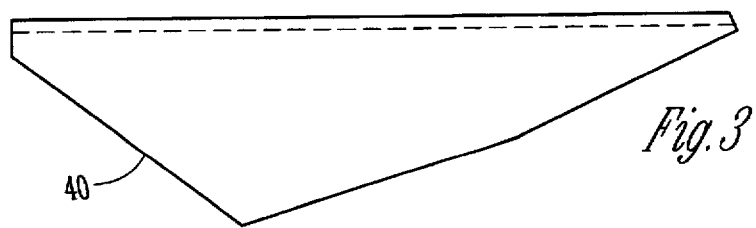
FIG. 3 is a plan view of the inner half section wall of the crop saving attachment.

The crop saving attachment of this invention is referred to generally in FIGS. 1 and 2 by reference numeral 10 and is shown mounted on the gathering point 12 of the left snout 14 of a corn head 16 on a JOHN DEERE combine 17.

A right gathering attachment 10A is shown mounted on a gathering point 12A of a right snout 14A. The left gathering attachment is shown in FIG. 1 deflecting a corn stalk 18 laterally inwardly toward the snapping rollers (not shown) conventional the corn head 16. An ear of corn 20 attached to the stalk 18 is seen laying on top of the gathering point 12 on the outside such that it will fall to the outside if it is not guided back into the corn head 16 by the left gathering attachment 10 which engages the stalk 18 as the snout 14 moves forward through the corn rows.

In FIG. 2 the gathering point 12 is seen pivotally connected to a rear snout section 22 by bolts 24 on opposite sides thereby allowing the gathering point to float over irregular terrain. The gathering point includes a wall made of plastic and has a metal tip 26 secured to it at its forward end. As seen in FIG. 2. the gathering point 12 and the rear snout section 22 has walls having upper surfaces inclined upwardly and rearwardly from the front of the rear of the snout 14.

Figure 8:
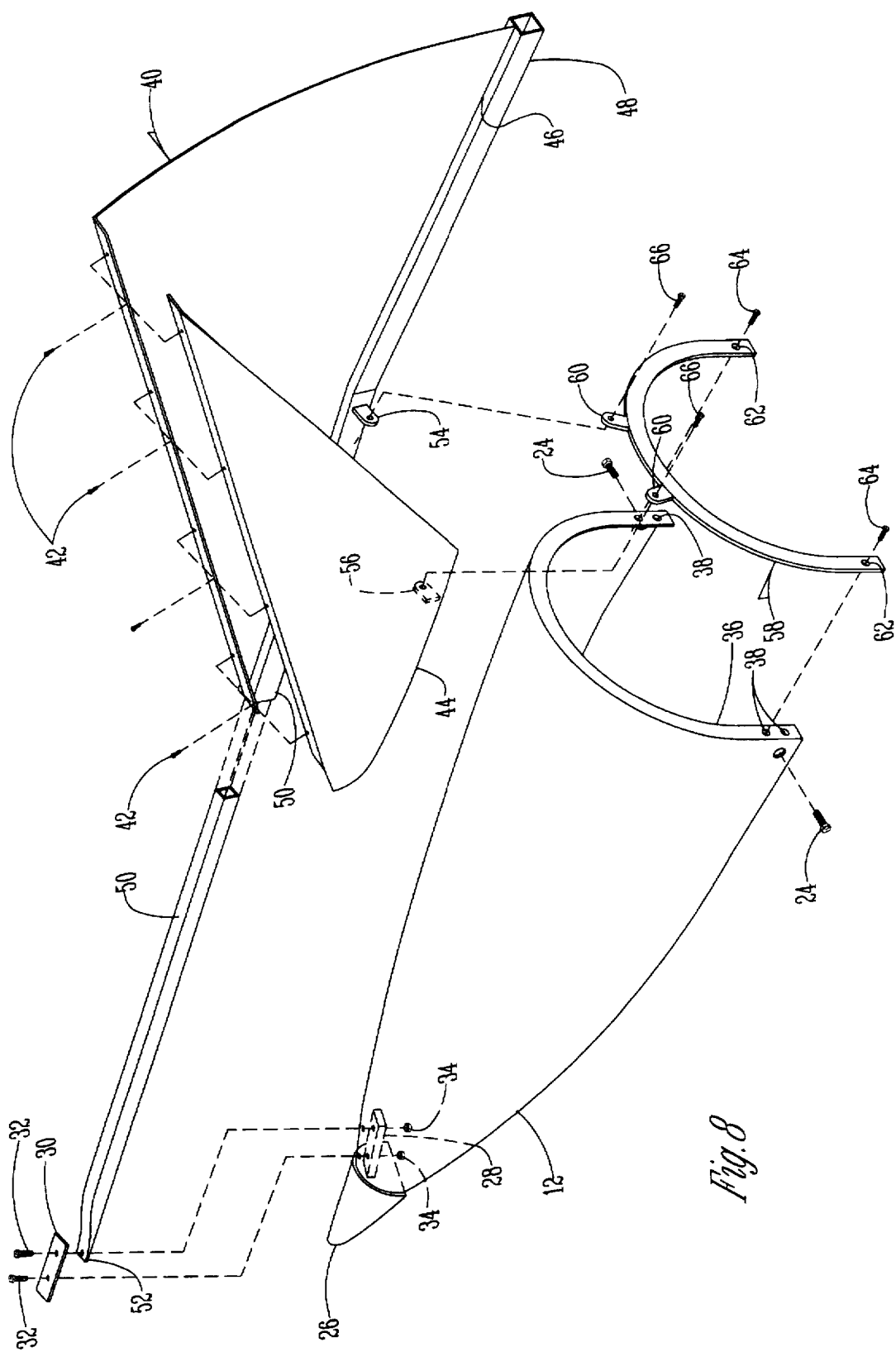
FIG. 8 is an exploded perspective view of the component parts of FIGS. 3–7 in position for being fastened to the gathering point.

Referring now to FIG. 8. the metal tip 26 is seen to include a bracket 28 which extends under the plastic gathering point wall and is fastened thereto by a plate 30 positioned on top of the gathering point wall and affixed thereto by a pair of bolts 32 which extend through the plate 30, gathering point wall and bracket 28 for engagement with nuts 34.

The rear end of the gathering point 12 includes an inverted U-shaped edge 36 which includes preexisting mounting holes 38 adjacent to the lower ends of the rear edge.

The left attachment 10 includes an inner half wall section 40 connected by bolts 42 to an outer wall section 44 along continuous side edges. The inner half wall 40 has a bottom lower edge 46 to which an elongated square cross section tube 48 is welded and telescopically receives at its forward end an elongated mounting plate member 50 which has a flattened end portion 52 at its forward end secured to the tip 26 by a bolt 32. It is seen that the flatted end portion 52 is positioned under the plate 30 and on top of the gathering point wall along it top surface.

The inner half section 40 includes a mounting tab 54 similar to an inwardly facing mounting tab 56 on the outer half section 44. The inverted U-shaped bracket 58 includes a pair of mounting tabs 60 extending upwardly and outwardly for engagement with the tabs 54 and 56 on the inner half wall section 40 and outer half wall section 44. The bracket 58 includes mounting holes 62 at its lower opposite ends which receive bolts 64 in turn received in mounting holes 38 on the rear edge 36 of the gathering point 12. Bolts 66 connect the tabs 60 to the tabs 54 and 56.

The elongated mounting member 50 is adjustably affixed to the tubular member 48 by a set screw 70 as seen in FIG. 7 thus creating a telescoping means.

The wall of the inner half section 40 includes oppositely disposed longitudinally extending bottom inner and outer edges. It is seen in FIG. 2 that the inner edge extends a substantial distance rearwardly over and along the snout rear section 22.

Thus it is seen that the gathering attachments 10 and 10A may be easily assembled and attached to a gathering points 12 and 12A utilizing existing fasteners on the gathering points making it unnecessary to drill any holes in the plastic gathering point walls. It is seen that only three bolts are utilized for securing the attachment to a gathering point.

What is claimed:

1. A combine head comprising a snout including a forward gathering point having a pointed forward end and an inverted U-shaped gathering point rear edge, said gathering point being hinged at said rear edge to a rear section fixed to the head of the combine, said gathering point and rear section each having walls having upper surfaces inclined upwardly and rearwardly from the front to the rear of the snout, and an attachment having at least one wall positioned over the upper surfaces of said gathering point and rear section and extending upwardly and rearwardly therefrom and fastened only to said gathering point for pivotal movement with said gathering point relative to said rear section and deflecting crop laterally inwardly towards an adjacent snout.

2. The combine head of claim 1 wherein said fastening of said attachment to said gathering point includes a rear bracket secured to the rear edge of said gathering point and an elongated mounting member having a forward end secured to the forward end of said gathering point.

3. The combine head of claim 2 wherein said rear bracket is inverted U-shaped and extends along the substantial height of said gathering point rear edge.

4. The combine head of claim 2 wherein said gathering point forward end is made pointed by including a tip having a mounting bracket extending under said gathering point wall, and a plate extends over the forward end of said attachment elongated mounting member, and at least one bolt secures said plate, said pointed forward end and said tip mounting bracket to said gathering point wall.

5. The combine head of claim 2 wherein said at least one wall of said attachment includes oppositely disposed longitudinally extending bottom inner and outer edges, said inner edge extending a substantial distance rearwardly over and along said snout rear section, said inner edge being connected to said elongated mounting member which is secured to the forward end of said gathering point.

6. The combine head of claim 4 wherein said at least one wall of said attachment includes oppositely disposed longitudinally extending bottom inner and outer edges, said inner edge extending a substantial distance rearwardly over and along said snout rear section, said inner edge being connected to said elongated mounting member which is secured to the forward end of said gathering point.

7. The combine head of claim 6 wherein said inner bottom edge of said attachment wall includes a telescopic means which adjustably and fixedly receives said elongated mounting member.

8. The combine head of claim 2 wherein the at least one wall of said attachment is further defined as being positioned at a rear portion of said gathering point with said elongated mounting member extending along the top surface of said gathering point to the forward end thereof.

9. The combine head of claim 1 wherein the at least one wall of said attachment is further defined as being formed from two elongated wall half sections interconnected along contiguous side edges.

10. The combine head of claim 5 wherein said rear bracket is inverted U-shaped and extends along the substantial height of said gathering point rear edge, said at least one wall of said attachment includes two elongated wall half sections interconnected along contiguous side edges, said inverted U-shaped bracket including two outwardly extending tabs interconnected with adjacent inwardly extending tabs on each of said wall half sections.

* * * * *